United States Patent

Nishikubo et al.

[15] 3,657,667

[45] Apr. 18, 1972

[54] OSCILLATOR WITH THREE-ARM MECHANICAL VIBRATOR CONNECTED TO SUPPRESS SPURIOUS VIBRATIONS

[72] Inventors: Yasuhiko Nishikubo, Iruma; Tsutomu Kojima, Kawagoe, both of Japan

[73] Assignee: Citizen Watch Co., Ltd., Tokyo, Japan

[22] Filed: Apr. 21, 1970

[21] Appl. No.: 30,421

[30] Foreign Application Priority Data

Apr. 23, 1969 Japan....................................44/36703

[52] U.S. Cl.............................331/116 M, 58/23 A, 310/25, 331/155, 331/156

[51] Int. Cl...........................................................H03b 5/30

[58] Field of Search................331/116 M, 155, 156; 310/25; 318/128; 58/23, 23 AO, 23 TF

[56] References Cited

UNITED STATES PATENTS

| | | | |
|---|---|---|---|
| 3,462,939 | 8/1969 | Tanaka et al | 58/23 TF |
| 3,517,230 | 6/1970 | Lewis et al | 310/25 |

*Primary Examiner*—Roy Lake
*Assistant Examiner*—Siegfried H. Grimm
*Attorney*—Sughrue, Rothwell, Mion, Zinn & Macpeak

[57] ABSTRACT

A piezo-electrically driven oscillator assembly, comprising a mechanical vibrator; piezo-electric elements attached thereto; and an electronic amplifier electrically connected with said piezo-electric elements, said assembly being characterized in that said vibrator is a three-arm type mechanical vibrator; said piezo-electric elements comprise two sensing piezo-electric elements and a sole driving piezo-electric element, each of said elements being glued to one of said three arms, with the arrangement of said elements and the structure of said amplifier so designed and arranged to substantially suppress spurious oscillation signals.

9 Claims, 11 Drawing Figures

INVENTORS
YASUHIKO NISHIKUBO
TSUTOMU KOJIMA

BY Sughrue, Rothwell, Mion, Zinn & Macpeak
ATTORNEYS

OSCILLATOR WITH THREE-ARM MECHANICAL VIBRATOR CONNECTED TO SUPPRESS SPURIOUS VIBRATIONS

This invention relates to improvements in and relating to a piezo-electrically driven oscillator serving as a timebase for use in a timepiece, such as wrist watch, car clock or the like, wherein superior resistance to outside disturbing oscillatory forces, shocks or oscillations is required.

It is known to use a piezo-electrically driven timebase oscillator wherein a mechanical oscillator such as tuning vibrator, tuning fork or the like vibratory member is used and two or more piezo-electric elements are fixedly attached onto the vibrator for performing the necessary piezo-electric drive. These elements are naturally arranged to cooperate with an electronic circuit means for the initiation and maintenance of the required oscillating movement of the mechanical vibrator. The output and input terminals of an amplifier included in said circuit are comprised of transistors and other non-linear circuit elements electrically connected with the electrodes of said piezo-electric elements, said terminals acting as the sensing and drive terminals for the necessary oscillative drive. In such an arrangement the piezo-electric elements, preferably shaped into strips, are attached normally on both surfaces of the oscillating arms of the mechanical oscillator or vibrator, as proposed by the prior U.S. Pat. No. 3,462,939. In this prior proposed device, six piezo-electric elements are glued to the vibrator. It would be highly desirous to reduce the number of the employed piezo-electric elements.

On the other hand, it is observed that none of the necessary shock-proof measures are provided in the attaching means of the piezo-electric elements and in the input part of the oscillating electronic circuit for attaining the correct and accurate timebase function of the whole assembly. Disturbing voltages may therefore be frequently invited in the sensing part of the assembly, being caused by outside shock or the like disturbing causes. If such disturbance should occur, electrical noises may be introduced to such a degree that the amplifier is brought thereby into its saturated condition, thereby the destined regular oscillative movement of the oscillator being disturbed, resulting in unfavorable and rather inaccurate operation of the oscillator assembly.

The main object of the present invention resides in the provision of a piezo-electrically driven oscillator assembly capable of obviating the aforementioned conventional drawback for the purpose of substantially suppressing the aforementioned kind of electrical noises and comprising a timebase having an improved shock-proof performance.

In a preferred embodiment of the invention for attaining the aforementioned main object, the mechanical oscillator or vibrator of three-arm type has a piezo-electric element glued onto each of said oscillating arms, two of these three piezo-electric elements being destined for acting as sensing means. Means are provided to suppress the unintentionally invited irregular and disturbing noise and the like electric signals appearing during the disturbing mode of oscillation.

These and further objects, features and advantages of the invention will become more apparent when reading the following detailed description of the invention by reference to the accompanying drawings illustrative of several preferred embodiments of the invention.

Figure 1:
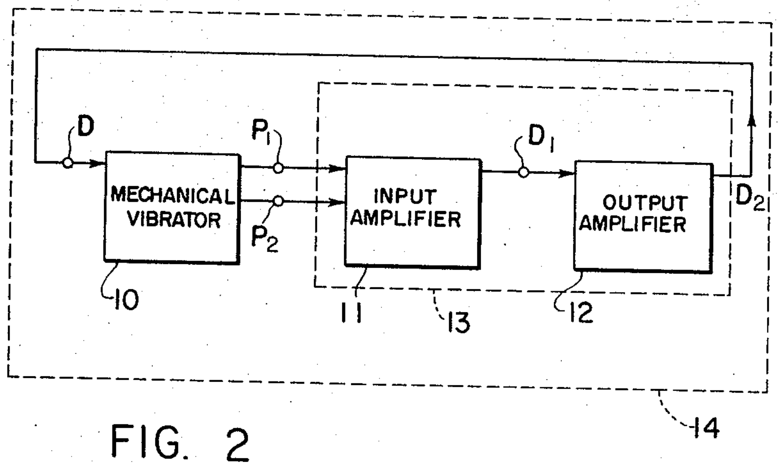
FIG. 1 is a block diagram showing several main parts of the piezo-electrically driven oscillator assembly.

Now referring to FIG. 1, the numeral 10 denotes in a highly simplified block form an oscillator assembly. The numeral 11 represents an input part of an amplifier 13; 12 denotes an output part of the same amplifier 13. The numeral 14 denotes the whole assembly including said several main components.

As will be more fully described hereinafter, the mechanical vibrator is fitted with two sensing piezo-electric elements and a sole driving piezo-electric element by glueing or a similar conventional technique. These sensing elements are electrically connected to input terminals $P_1$ and $P_2$; an output terminal $D_1$ of the amplifier input part 11 is electrically connected to the output part 12 of the amplifier of the oscillator circuit, as shown. Output terminal $D_2$ of the amplifier output part is electrically connected with a terminal D provided for the driving piezo-electric element attached fixedly to the timebase mechanical vibrator 10, as was referred to above.

The expression "amplifier 13" will mean hereinafter the input part 11 and the output part 12 of the oscillator circuit, and the expression "piezo-electrically driven oscillator 14" means hereinafter the timebase mechanical vibrator 10 and the amplifier 13.

The oscillator assembly will be described more in detail by reference to FIGS. 2–11.

Figures 2, 4:
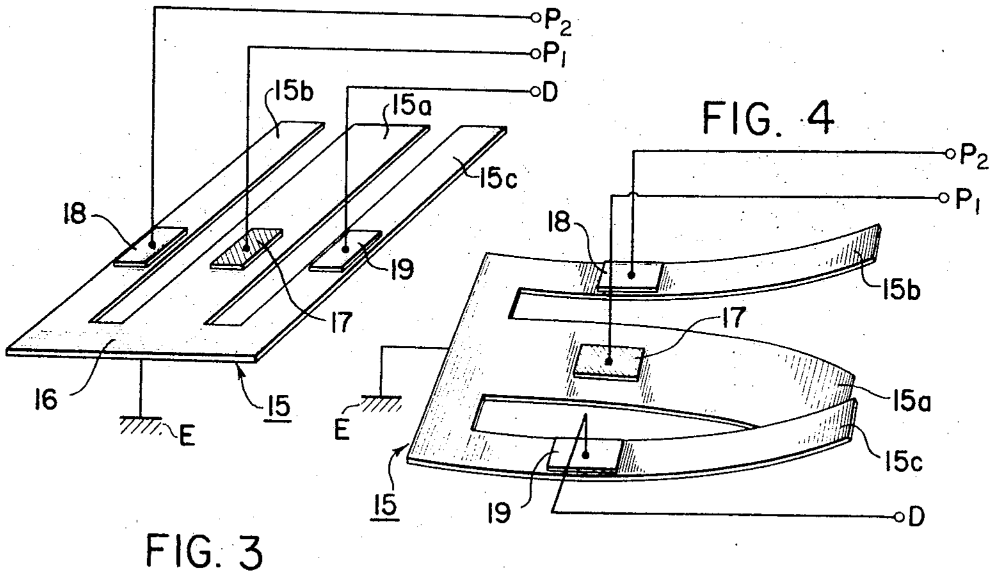
FIG. 2 is a perspective view of a preferred embodiment of the oscillator.
FIGS. 4 and 5 are schematic perspective views of the oscillator shown in FIG. 2, illustrating two different working modes thereof.
Figures 3, 5:
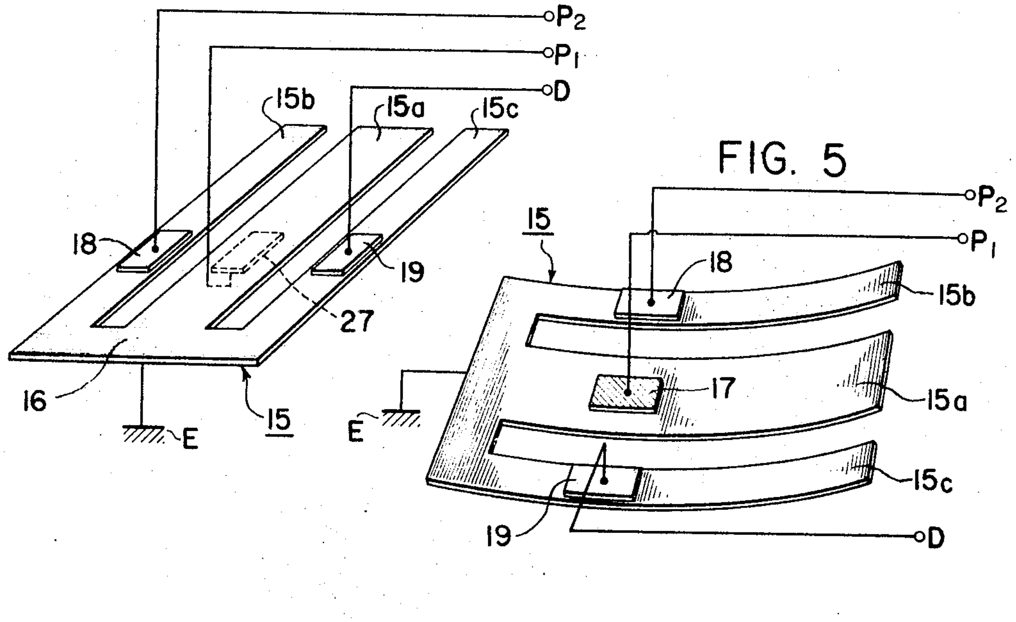
FIG. 3 is a similar view of FIG. 2, showing a modification.

In FIGS. 2–3, the mechanical vibrator shown generally at 15 comprises three parallel oscillator arms **15*a*, 15*b* and 15*c* arranged in a common horizontal plane, these arms being arranged for oscillation in the perpendicular direction relative to said common plane. In this timebase mechanical vibrator, the central arm 15*a* is arranged to oscillate in the reverse phase to that of the oscillation performed by the two remaining or outer arms 15*b* and 15*c*. The mechanical vibrator 15 comprises a lateral root portion 16 which connects the root portions of all the vibrator arms one after another, as shown, said lateral root portion 16 being rigidly supported by screw or other conventional fixing means on a conventional plate of a timepiece. On the same side surfaces of these oscillator arms 15*a*, 15*b* and 15*c*, piezo-electric elements 17, 18 and 19** are fixedly attached by glueing and electrically connected with each other through the amplifier of the oscillator circuit.

Piezo-electric elements 17–19 cooperate with the amplifier of the oscillator circuit so as to drive piezo-electrically the mechanical vibrator 15. In the present embodiment, the elements 17 and 18 are designed and arranged as sensing means and connected to the input terminals $P_1$ and $P_2$ of the amplifier, while the element 19 is utilized as the drive means, the latter element being connected to the output terminal $D_2$ of the amplifier.

FIG. 3 shows a modification from the foregoing. Same or similar parts are shown by the respective same references. As seen, the basic design and arrangement are similar as before. Piezo-electric elements 27, 18 and 19 are fixedly mounted on the arms **15*a*, on the one hand, and 15*b* and 15*c***, on the other hand, on the reverse surfaces, or on the lower surface of the central arm, and on the upper surface of the side arms, these piezo-electric elements being, however, of same plurality when seen at their glued areas.

Figure 6:
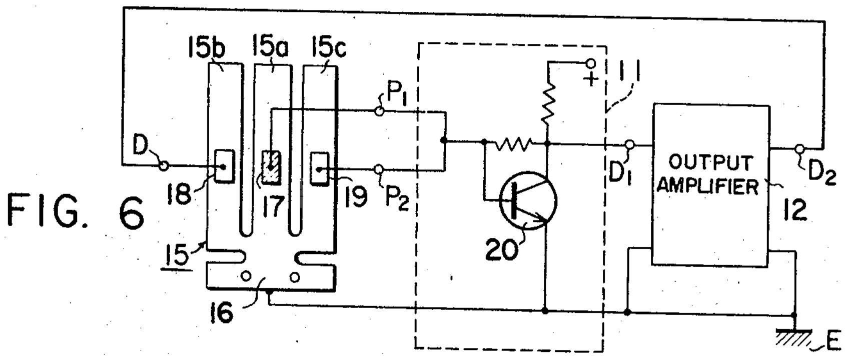
FIGS. 6–11 are several connection diagrams of electronic circuits employable in this invention.

In the circuit arrangement shown in FIG. 6, the input part 11 of the amplifier comprises a single transistor 20 the base electrode of which is connected to the terminals $P_1$ and $P_2$ provided for the sensing piezo-electric elements 17 and 19 mounted on the arms **15*a* and 15*c* and having opposite polarities to each other when viewed at the nearest surfaces of said elements to the bearing surfaces of the vibrator arms. The output terminal $D_1$ of said transistor 20 is connected to the output part 12 of the amplifier. The output terminal $D_2$ of output part 12 is connected to the terminal D of the sole driving piezo-electric element. The root portion 16** of the mechanical vibrator and the ground terminal of the amplifier are connected to earth. The symbol "+" denotes a terminal which acts as voltage supplier to the amplifier and is connected to a certain voltage source, not shown.

Figure 7:
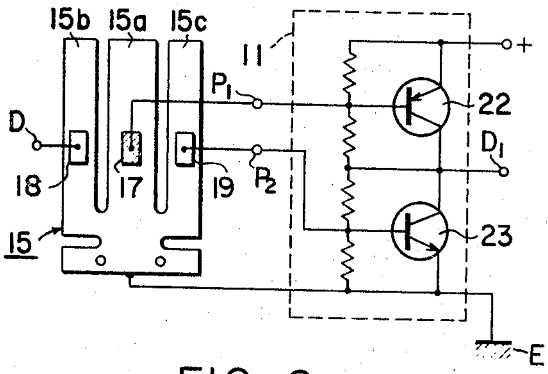

In the arrangement shown in FIG. 7, the attaching mode of the piezo-electric elements is same as that employed in FIG. 6. More specifically, all the piezo-electric elements are attached on the same side surfaces of the vibrator arms and in opposite polarity relationship one after another when seen laterally of the vibrator and successively in one direction.

In the present embodiment of the electronic circuit, the input part 11 of the amplifier comprises two transistors 22 and 23 which are of the opposite conductivities to each other. The collectors of these transistor are electrically connected with each other, the common output terminal of these transistors being denoted $D_1$ which is connected further to the amplifier or directly to the terminal D of the driving piezo-electric element. The base electrodes of these transistors are connected with the terminals $P_1$ and $P_2$ for the sensing piezo-electric elements.

Figure 8:
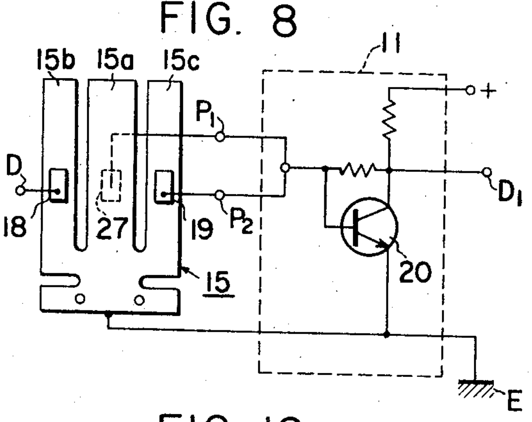

In the modified circuit arrangement shown in FIG. 8 the piezo-electric element shown at 27 is attached fixedly on the central arm 15*a* of the mechanical vibrator. This element 27 is mounted on the back surface of the control arm, while the remaining elements 18 and 19 are mounted on the front or upper surfaces of the outer arms 15*b* and 15*c*, respectively. These elements 18, 19 and 27 represent the same polarity pole in contact with the respective mounting arms. Two arms 27 and 19 serve as sensing means and are connected to terminals $P_1$ and $P_2$ which are commonly connected to the input part 11 of the amplifier. Design and arrangement of the input part 11 are similar to the corresponding part shown in FIG. 6.

Figure 9:
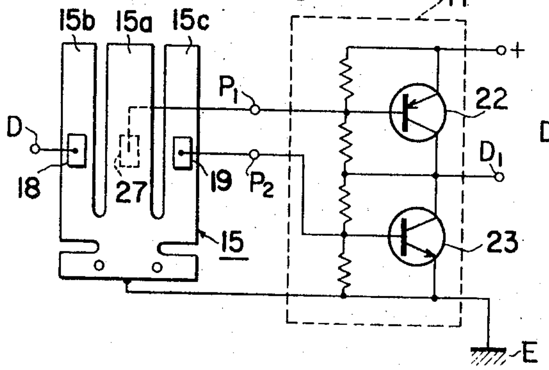

In the still further modified arrangement shown in FIG. 9, the attachment mode of the piezo-electric elements is just same as was shown in FIG. 8. In this arrangement, the design and arrangement of the input part 11 of the oscillator circuit are same as that shown in FIG. 7.

Figure 10:
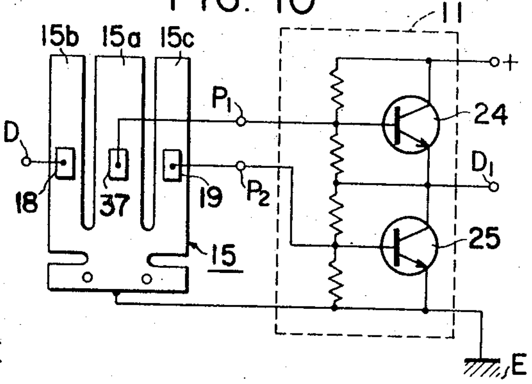

In a modified arrangement shown in FIG. 10, piezo-electric elements 37, 18 and 19 are fixedly mounted on the same side surfaces of the respective carrier arms 15*a*, 15*b* and 15*c*, respectively, and with their polarities nearest to the respective carrier arms being the same. Two elements 37 and 19 are destined for the sensing service and connected to the terminals $P_1$ and $P_2$. The input part of the amplifier comprises two transistors 24 and 25 of the same polarity type wherein the emitter of the former is connected with the collector of the latter. Said terminals $P_1$ and $P_2$ for the sensing transistors 37 and 19 are connected to the respective base electrodes of these transistors 24 and 25, respectively.

Figure 11:
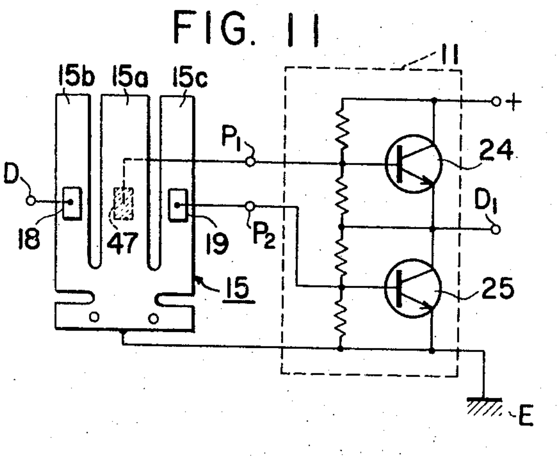

In a still further modified arrangement shown in FIG. 11, the piezo-electric element shown at 47 is fixedly mounted on the lower surface of the central vibrator arm 15*a*, while the two remaining elements 18 and 19 are mounted on the opposite side or upper surfaces of the outer arms 15*b* and 15*c* of the mechanical vibrator. The polarities of the first piezo-electric element is in opposition to that of the remaining two, when seen nearest to the respective bearing arm surfaces. Two elements 47 and 19 are connected to terminals $P_1$ and $P_2$. The design and arrangement of input part 11 of the amplifier are same as those employed in the foregoing arrangement shown in FIG. 10.

The operation of the timebase oscillator is as follows:

The perspective view shown in FIG. 4 illustrates a step of the regularly oscillating mode of the mechanical vibrator. In this operational mode, the outer arms 15*b* and 15*c* oscillate in unison with each other, yet in the opposite phase to the oscillating mode of the central arm 15*a*. Such oscillation mode with use of a three-arm type vibrator is disclosed in the aforementioned prior U.S. Pat. No. 3,462,939.

Since, in the present embodiment, the centrally arranged element 17 and one of the outer elements such as at 18 are utilized as sensing means with their polarities selected to be opposite to each other, the voltages sensed by these elements 17 and 18 have the same sign and are applied between the output terminals $P_1$ and $P_2$, on the one hand, and the ground "E," on the other hand, so far as the mode of the oscillation is of the regular one. In this way, an amplified voltage signal will appear at the output terminal $D_1$ of the output part 11 of the amplifier. Therefore, the vibrator can maintain its oscillation movement, as will be easily understood by any person skilled in the art.

In FIG. 5, an irregular or spurious mode of oscillation of the mechanical vibrator is illustrated, as being caused by an outside shock. In this case, all the oscillative arms 15*a*, 15*b* and 15*c* will perform an oscillation in a common phase relation with each other. The induced voltages between the terminals $P_1$ and $P_2$, and the ground will be in opposite senses to each other, thus practically no output voltage will appear between the output terminal $D_1$ and the ground, when assuming that these arms oscillate with a same amplitude at a certain time point.

Next referring again to FIG 7, it will be apparent that with the regular mode of oscillation of the mechanical vibrator, voltages having a same sign are periodically applied to the sensor terminals $P_1$ and $P_2$ and the transistors 22, preferably of PNP-type, and 23, preferably of NPN-type, are brought into conduction alternately and at every half cycles, thus the regular mode of oscillation being maintained. If an outside shock is applied to the oscillator and oppositely signed voltages are induced in the sensing elements and then applied to the sensor terminals $P_1$ and $P_2$, the result will be a simultaneous conduction or interruption of both transistors 22 and 23 which are not capable of performing their function as the active elements.

The operation of the arrangements shown in FIGS. 8 and 9 correlated with FIG. 3 is similar to that of those which are shown in FIGS. 6 and 7. Thus, it can be easily understood from the foregoing description without further analysis.

In the modified arrangement shown in FIG. 10, it will be easily seen that induced voltages having opposite signs will be applied to the sensor terminals $P_1$ and $P_2$, so far as the mechanical vibrator performs its regular mode oscillation, the transistors 24 and 25 will perform their regular function when they are brought alternately into conducting state with every half cycle. The thus amplified output will be applied to the input terminal D of the driving piezo-electric element 18, thus the desired regular oscillation movement of the mechanical vibrator is maintained.

If however a sudden and substantial shock is applied from outside to the oscillator assembly so that a spurious vibration is induced in the mechanical vibrator, then voltages of the same sign will be applied to the sensor terminals $P_1$ and $P_2$ and thus the transistors 24 and 25 are brought into conduction or interruption simultaneously with each other. Thus, they cannot perform their destined function as active circuit elements.

In this way, it will be clear that only the regular mode signal will appear, upon being amplified, at the output terminal $D_1$. It can be thus seen that the oscillator assembly provides a damping action for supressing a spurious oscillation, even when the thus invited irregular input signals should be applied to the electronic circuit comprised therein.

The operation of the arrangement shown in FIG. 11 is similar to that of the foregoing arrangement shown in FIG. 10 which has been described hereinabove so that no further detailed analysis of the present arrangement in this respect would be necessary for better understanding of the invention.

Throughout the aforementioned embodiments, the glueing agent may preferably be epoxy resin such as "Araldite" manufactured and sold by Ciba Ltd., Basel, Switzerland.

As ascertained by the foregoing detailed description, it will be clear that an application of unintentional outside disturbing force such as outside shock or the like to the mechanical oscillator employed as the timebase will not result in an introduction of spurious oscillation signal to the electronic circuit employed, by being opposed electrically. Therefore, the oscillator assembly proposed by the invention provides superior damping action against the application of outside and spurious oscillative causes and thus highly adapted for use with various time-measuring instruments such as high precision timepieces.

The embodiments of the invention in which an exclusive property or privilege is claimed, are as follows:

1. In an oscillator assembly comprising a transistor amplifier including non-linear circuit element means, and a mechanical vibrator having three oscillative arms arranged in parallel to each other in a common plane and adapted for oscillation in respective perpendicular planes to said common plane and for electronically cooperating with said amplifier, the improvement comprises:

1. a piezo-electric element fixedly mounted on each of said arms;
2. one of said elements which is mounted on the centrally arranged arm and one of said elements which is mounted on one of two outer arms being connected as sensing means to the input of said amplifier and the remaining sole element being connected as driving means with the output of said amplifier;
3. the sensed signal in and delivered from said sensing elements with the regular oscillative movement of said vibrator being conveyed to and amplified in said amplifier and that sensed during a spurious movement of the vibrator being subjected to a substantial damping effect.

2. An oscillator assembly as claimed in claim 1 wherein the sensing piezo-electric elements are attached to the respective oscillative arms with their polarities opposite to each other when seen on the attached surfaces of the elements.

3. An oscillator assembly as claimed in claim 2, wherein the input of the amplifier comprises a single transistor.

4. An oscillator assembly as claimed in claim 2, wherein the input of the amplifier comprises two transistors having opposite conductivities to each other.

5. An oscillator assembly as claimed in claim 1, wherein said sensing piezo-electric elements are attached to the opposite side surfaces of the respective carrier oscillative arms relative to each other, with their polarities when seen on the attached surfaces being selected in the same sense.

6. An oscillator assembly as claimed in claim 5, wherein the input of the amplifier comprises a single transistor.

7. An oscillator assembly as claimed in claim 5, wherein the input of the amplifier comprises two transistors having opposite conductive characteristics to each other.

8. An oscillator assembly as claimed in claim 1, wherein said sensing piezo-electric elements are attached to the same side surfaces of the respective carrier oscillative arms, with their polarities, when seen on the attached surfaces, selected to be of the same sense, and the input of the amplifier comprises two transistors of the same conducting type.

9. An oscillator assembly as claimed in claim 1, wherein said sensing piezo-electric elements are attached to the opposite side surfaces of the respective carrier oscillative arms, with their polarities, when seen on their attached surfaces, selected to be of the same sense, and the input of the amplifier comprises two transistors of the same conducting type.

* * * * *